United States Patent
Rogers, Jr. et al.

[19]

[11] Patent Number: 6,022,166
[45] Date of Patent: Feb. 8, 2000

[54] SELF LOCKING, RATTLE RESISTANT FORK BOLT

[75] Inventors: Lloyd Walker Rogers, Jr., Shelby Township, Macomb County; David A. Sedlak, Clarkston; Joseph Michael Johnson, Huntington Woods; Reginald Leo Mc Donald, Macomb Township, Macomb County, all of Mich.

[73] Assignee: Lear Corporation, Southfield, Mich.

[21] Appl. No.: 09/104,164

[22] Filed: Jun. 25, 1998

[51] Int. Cl.⁷ ...................................................... F16B 2/18
[52] U.S. Cl. .................................... 403/322.4; 403/322.1; 403/330; 248/503.1; 297/336; 296/65.03
[58] Field of Search .................................... 403/326, 327, 403/330, 322.4, 322.1, 325, 321; 296/65.03; 297/335, 336; 248/503.1; 292/122, 220

[56] References Cited

U.S. PATENT DOCUMENTS

| | | | |
|---|---|---|---|
| 3,594,852 | 7/1971 | Krawagna ................................. | 16/150 |
| 3,661,172 | 5/1972 | Miller ...................................... | 137/434 |
| 3,781,062 | 12/1973 | Farmer et al. ..................... | 297/378.13 |
| 4,865,377 | 9/1989 | Musser et al. ................... | 248/503.1 X |
| 5,125,711 | 6/1992 | Syed et al. ....................... | 248/503.1 X |
| 5,482,345 | 1/1996 | Bolsworth et al. .................... | 276/65.1 |
| 5,562,322 | 10/1996 | Christoffel .......................... | 297/336 X |
| 5,671,965 | 9/1997 | O'Connor ........................... | 297/336 X |
| 5,685,612 | 11/1997 | MacDonald et al. ............... | 297/378.1 |
| 5,697,662 | 12/1997 | Leftwich .......................... | 248/503.1 X |
| 5,730,480 | 3/1998 | Takamura ........................ | 248/503.1 X |
| 5,803,549 | 9/1998 | Bolsworth et al. ............. | 296/65.03 X |

*Primary Examiner*—Harry C. Kim
*Attorney, Agent, or Firm*—Brooks & Kushman P.C.

[57] ABSTRACT

A self locking forkbolt for pivoting the end of a pivoting seat back frame to a vehicle body includes a pin that is locked into a slot by the end of a hook that swings on a pivot axis across the slot, from an open to a closed position. A locking lever fixed to the hook moves with the hook, and a cam lever pivoted to the same pivot axis, located on to of the locking lever, has a striker edge that is engaged by the pin first as the pin is pushed into the slot. The force transfer connection between the cam lever and the hook/locking lever is indirect, consisting of a spring that is compressed by the pivoting cam lever to, in turn, push on the hook. The locking lever pops into a latched position as the hook swings closed, and the spring remains at least slightly compressed, reducing rattle of the pin within the slot.

3 Claims, 4 Drawing Sheets

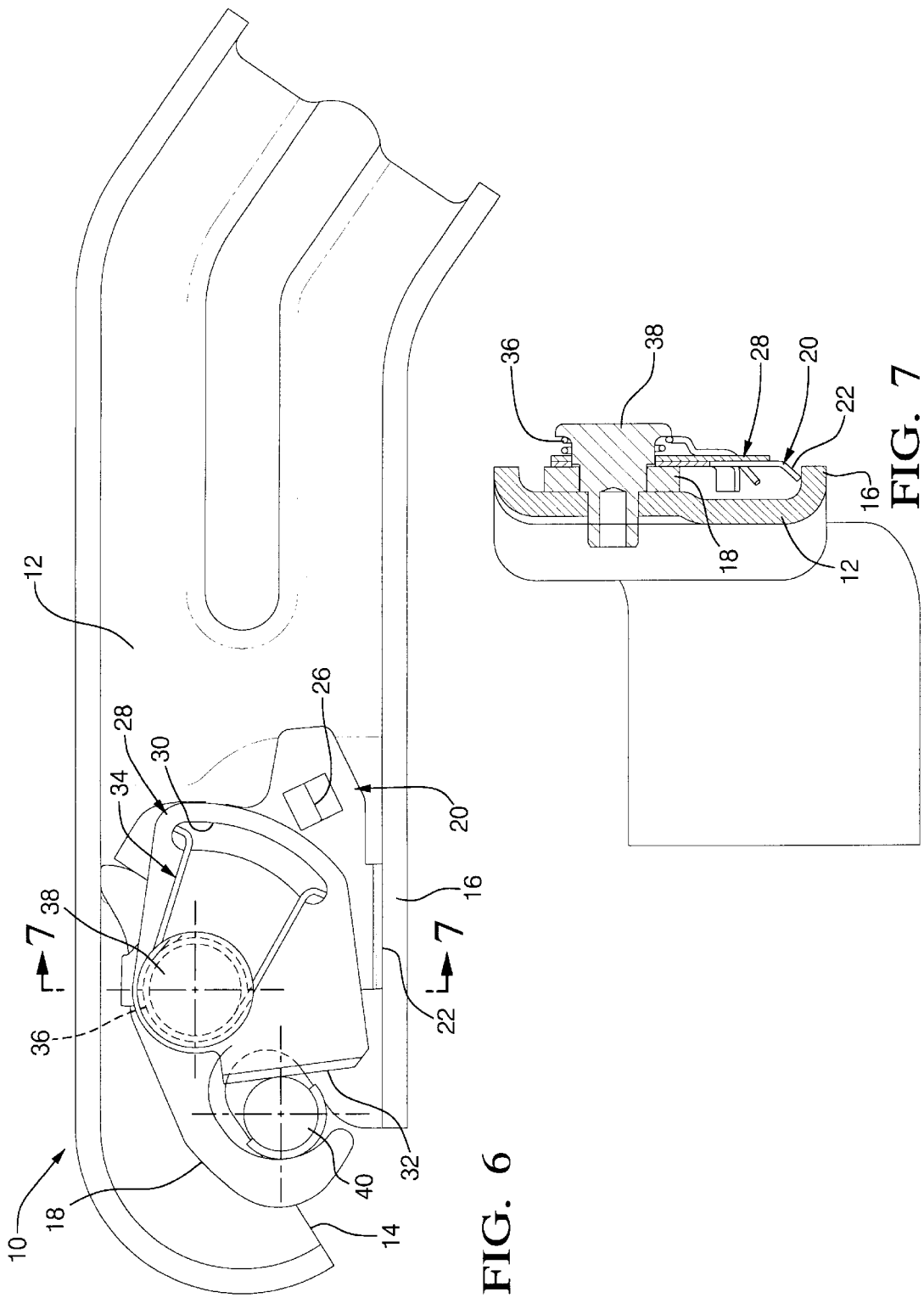

SELF LOCKING, RATTLE RESISTANT FORK BOLT

TECHNICAL FIELD

This invention relates to fork bolts of the type used to lock the lock the end of a pivoting seat back frame to a vehicle body.

BACKGROUND OF THE INVENTION

Recent two seater vehicles with a traditional trunk space often incorporate pivoted dual seat backs that can be pulled down one at a time, or together, to open the trunk space up to the rear passenger space. Typically, the lower ends of the legs of the seat back frame contain a closed end slot within which is locked a pivot pin fixed to the vehicle floor, although those two parts can be reversed. It is preferable if the mechanism that locks the pin into the slot, typically called a forkbolt, is passively acting, that is, that the act of pushing the slot over the pin alone acts to engage the lock or latch. A typical example may be seen in U.S. Pat. No. 5,685,612, although the slot and pin there are reversed. The hook is constantly spring loaded to a locked position across the slot, but the pin can kick the hook out of the way as it is pushed into the slot. The hook then springs back passively to the latched position to capture the pin in the sloth. The inherent draw back which any such system is that it does not securely lock the pin into the slot.

SUMMARY OF THE INVENTION

The preferred embodiment of the forkbolt of the invention disclosed employs a locking lever, fixed to the pivoting hook and movable therewith, which has a locking tab that overlies a raised edge on the frame leg in the open position, but moves inboard of the raised edge in the closed position. The locking lever also includes an arcuate slot arrayed about the pivot axis. A cam lever overlies the locking lever, pivoting on the same axis, with a matching arcuate slot. When the hook is in the open position, with the slots aligned, a striker edge of the cam lever crosses the slot, resting across the entry path of the pivot pin. A compression spring hooked between the matching ends of the two slots resiliently keeps the slots aligned, in the absence of a force tending to compress the spring. In addition, in the embodiment disclosed, the spring is a two legged, clothespin style spring with a central coil wrapped about the pivot axis. The central coil aids in pushing the two levers downwardly, in the hook open position, so as to keep the locking tab frictionally engaged with the frame leg's raised edge to hold the hook open.

As the slot is pushed forcibly down and over the stationary, rigid pin, the striker edge of the cam slot is first engaged, compressing the spring and swinging one slot out of alignment with the other. When the spring is compressed farther, it overcomes the frictional hold open force of the locking lever, pushing it and the hook to the closed position to capture. The spring's central coil pin is then able to expand and the locking tab is now captured by the raised edge to keep the hook latched in the closed position, resisting any twisting loads that would tend to dislodge the pin. In addition, the cam lever is spring loaded so as to swing back toward its original orientation relative to the locking lever and hook, as the spring re aligns the two arcuate slots. The spring now also serves to resiliently load the captured pin between the striker edge of the cam lever and the hook, reducing rattle of the within pin within the slot.

BRIEF DESCRIPTION OF THE DRAWINGS

These and other features of the invention will appear from the following written description, and from the drawings, in which;

FIG. 6 is a plan view of the slot and pin when the pin is locked into the slot in the hook closed position; and FIG. 7 is a cross sectional view taken along the line 7—7 of FIG. 6.

DESCRIPTION OF THE PREFERRED EMBODIMENT

Figure 1:
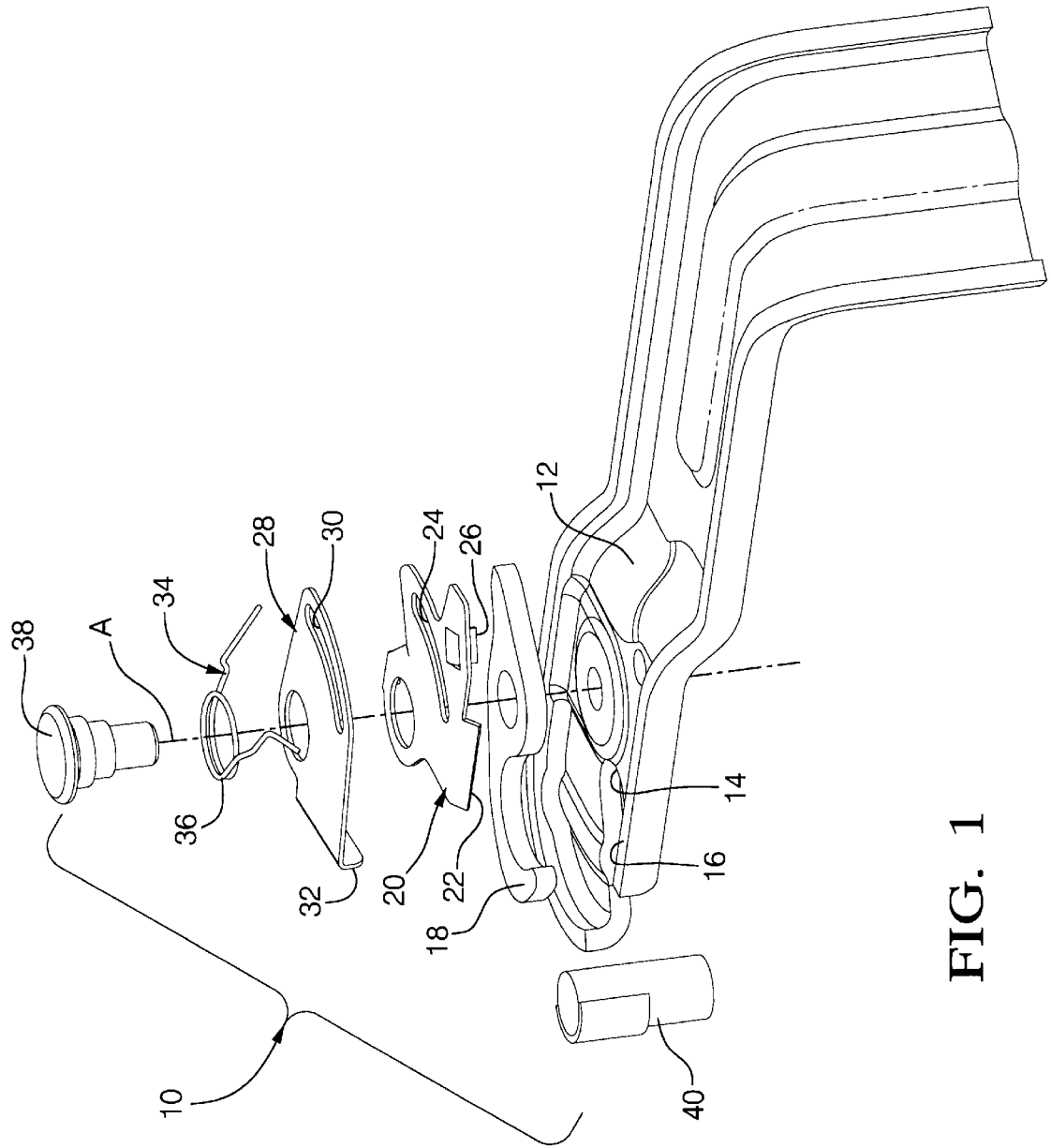
FIG. 1 is an exploded perspective view of the various components of the invention.

Referring first to FIG. 1, a preferred embodiment of the forkbolt of the invention is indicated generally at 10. The primary structural framework is a generally planar seat back frame leg 12, the end of which contains a closed ended slot 14. While basically planar, the periphery of the frame leg 12 is formed with a raised edge 16, for structural rigidity and strength. A hook 18 swings about a central axis A in manner described in more detail next. A locking lever, indicated generally at 20, is a planar, stamped metal piece, designed to swing one to one with the hook 18, about the same axis A, which has several features incorporated into its structure. A locking tab 22 is bent down from an edge near the frame leg's raised edge 16, at about a 45 degree angle. An arcuate slot 24 is arrayed about the central axis A. In addition, the embodiment disclosed, a short depending flange 26 is lanced out just inboard of the locking tab 22. Laying above the locking lever 20 is a cam lever 28 of similar material, indicated generally at 28. Cam lever 28 has an arcuate slot 30, matching the other arcuate slot 24, and a bent over striker edge 32. A two legged compression spring, indicated generally at 34, has a central coil 36. The legs of the spring 34, in the free state shown, are spaced farther apart than the end to end length of the two slots 24 and 30, but can be pinched together, which is resisted by the coil 36. The central coil 36 is also capable of a small degree of axial compression and expansion. All of the components are show aligned with a headed central pivot shaft 38, which passes through the central spring coil 36, the cam lever 28, the locking lever 20, and the hook 18, in that order, to pivot all components to the leg 12, on the central axis A. These pivoted components interact with a rigid, fixed pin 40 in a manner described next.

Figure 2:
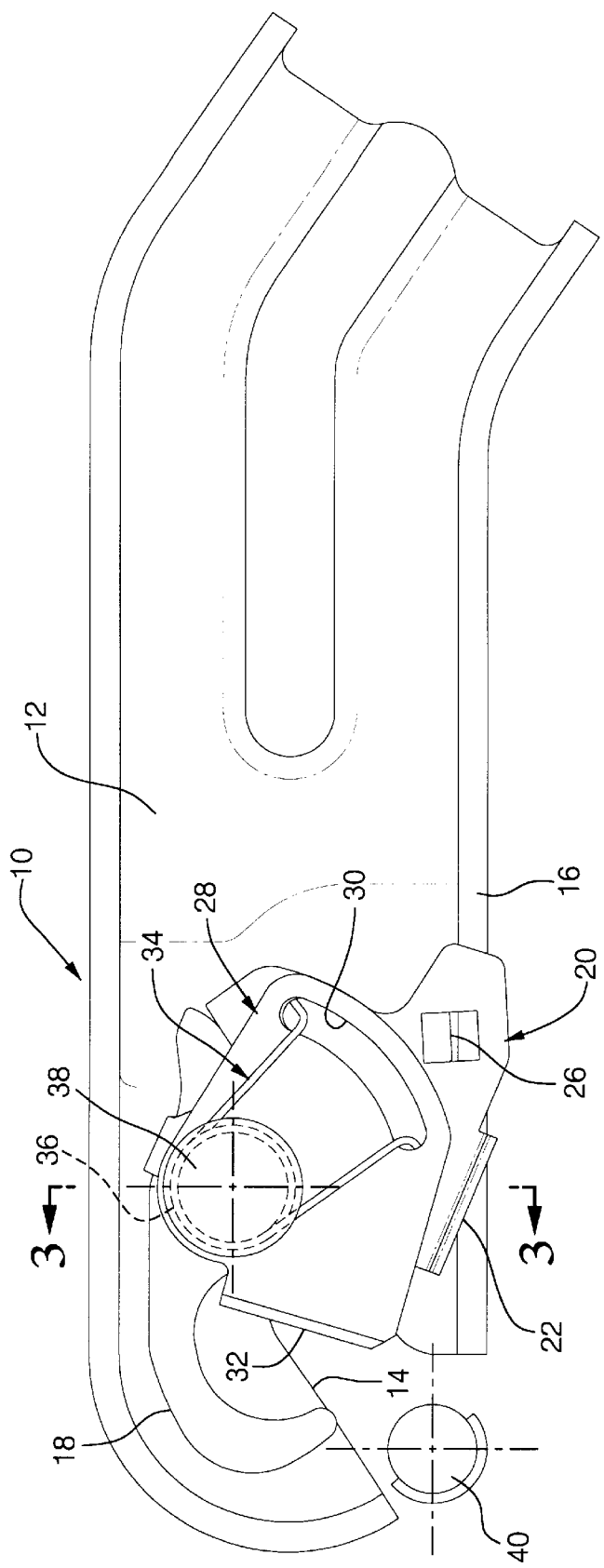
FIG. 2 is a plan view of the slot and pin when the hook is held in the open position.
Figure 3:
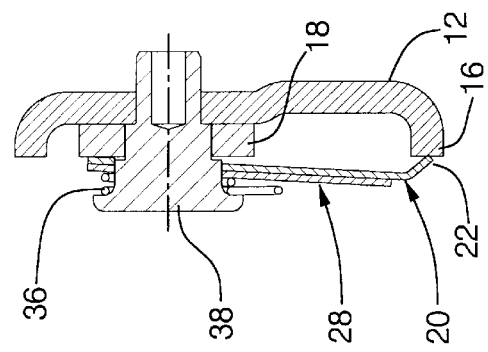
FIG. 3 is a cross sectional view taken along the line 3—3 of FIG. 2.

Referring next to FIGS. 2, 3 and 7, locking lever 20 is fixed to the back end of hook 18 so as to act as an extension thereof, swinging in the opposite direction about pivot shaft 38, one to one, when the front end of hook 18 swings in either direction. Locking lever 20 could be rigidly fixed to hook 18 by capture tabs, welding, or any other secure means. The hook 18 is designed to swing on the shaft 38 from a FIG. 2 open position, clear of the slot 14, to a FIG. 7 closed position, crossing and blocking the slot 14. As illustrated in FIGS. 2 and 3, when the hook and locking lever 20 are in the closed position, the cam lever 28 is maintained in a ready position by the fact that the legs of the spring 34, in attempting to return to their free state separation, provide a return force pushing continually outwardly against the ends of the two slots 24 and 30 to keep them aligned. In the ready position, the cam lever striker edge 32 rests across the slot 14 to form a shallow V therewith. Furthermore, in the FIG. 2 open position, the locking lever 20 is pulled up and pivoted outboard to the point that the locking tab 22 overlies the leg's raised edge 16. The natural resistance of the thin locking lever 20 to being bent resiliently out of its planar shape, in addition to the axial compression of the spring's central coil 36, push the locking lever 20 down to keep the locking lever 20 frictionally engaged with the raised edge 16. This keeps the locking hook 18 in the open position, effectively "cocked" and ready to interact with the pin 40. In addition, in the embodiment disclosed, the depending flange 26 acts as a stop member that engages the inner surface of the raised edge 16 to prevent the locking lever 20 from being rotated too far outboard.

Figure 4:
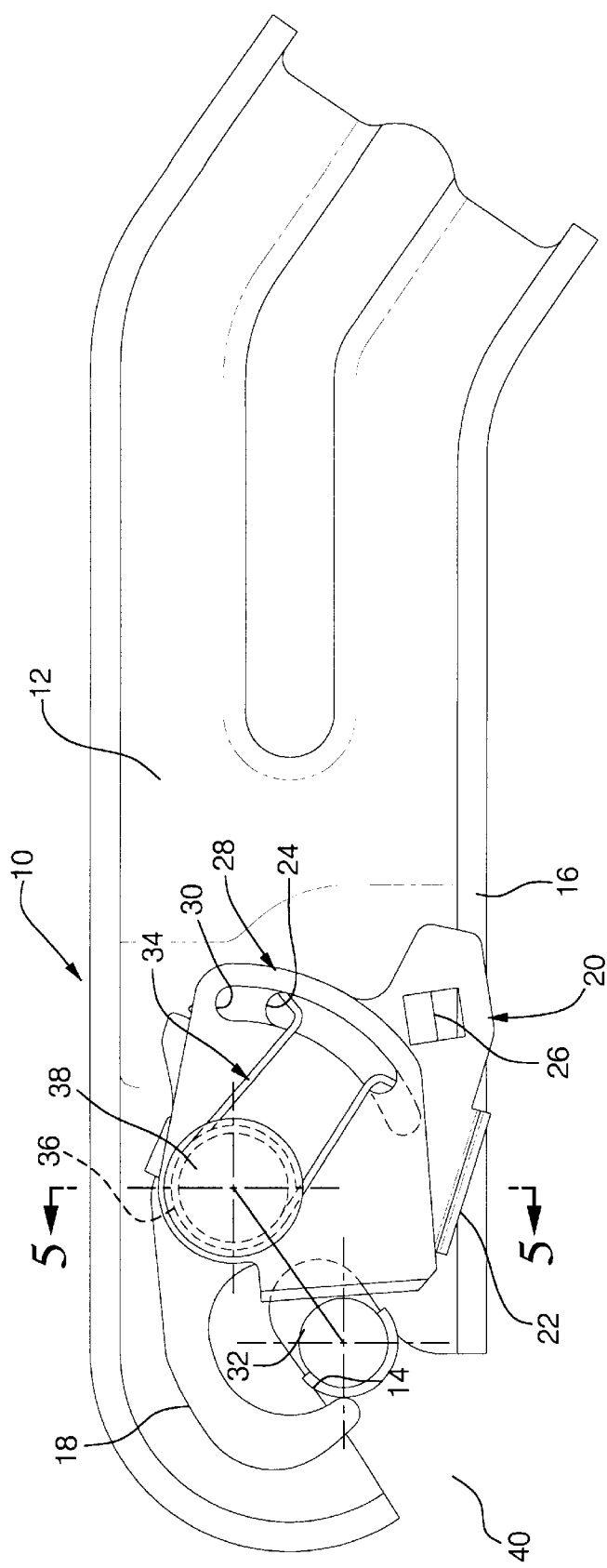
FIG. 4 is a plan view of the slot and pin when the pin is in the process of being pushed into the slot.
Figure 5:
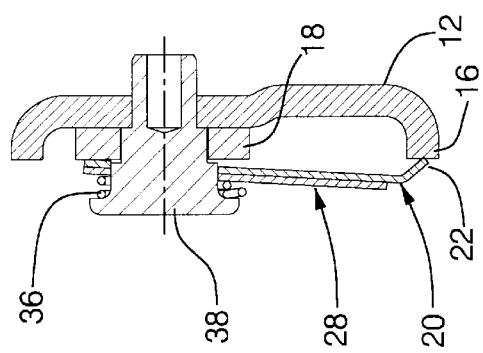
FIG. 5 is a cross sectional view taken along the line 5—5 of FIG. 3.

Referring next to FIGS. 4 and 5, the seat is installed by pushing the frame leg 12 down to force the pin 40 into the slot 14. The pin 40 pushes into the shallow V described above, force against the cam lever's striker edge 32, and swings the cam lever 28 inwardly about the pivot shaft 38, compressing the legs of the spring 34 farther. The return force of the compressed spring 34 increases with compression and, in turn, presses on the locking lever 20 and the hook 18, beginning to swing them in the same direction. The return force translated from cam lever 28 to locking lever 20, through the compressed spring 34, is enough to begin to push the locking lever 20 off of the raised edge 16, exceeding the frictional "hold open" force. However, the cam lever's striker edge 32 never directly engages the body of the hook 18, so that the force transfer is entirely "resilient," acting entirely through the medium of the compressed spring 34.

Referring next to FIGS. 6 and 7, as the pin 40 is pushed farther into slot 14, cam lever 28, locking lever 20, and hook 18 are swung far enough inwardly that the locking tab 22 pops down off of the raised edge 16 to the closed position shown. The locking lever 20 springs back to its flat, unstressed condition, as the central spring coil 36 expands. Both actions serve to keep the locking lever 20 in the orientation shown, and the locking tab 22 now will hit the inside of the raised edge 16 if any force acts to rotate it back out. The pin 40 is therefore very solidly locked into the slot by the hook 18. In addition, the pin 40 is not trapped directly between the inside of the hook 18 and the closed end of the slot 14, as is conventional, and which would be subject to rattle. As the locking lever 20 pops down to the locked position, the frictional force resisting the return force of the spring 34 ends, and the legs of spring 34 can re expand and realign the slots 30 and 24. Since the cam lever 28 never bottomed out on the hook 18 as the pin 40 was pushed in, the pin 40 is resiliently held between the spring loaded striker edge 32 and the inside edge of the hook 18. Therefore, the pin 40 is held substantially rattle free, with the ability to dampen shifts and vibrations within slot 14. Even if the tolerances between parts are such that the slots 24 and 30 do not totally realign, there is still enough room left for spring 34 to expand, and provide the resilient capture. While hook 18 and locking lever 20 are very securely locked in the position shown, by the locking lever 20, raised edge 16, and the downward axial bias of spring coil 36, it would be possible to externally lift the end of locking lever 20, bending it up and compressing spring coil 36, and then rotate it back to the open position. However, this would have to be very deliberately done with an external force applied by a prying tool pulling axially up on the back of locking lever 20. Typical twisting loads on pin 40 would not dislodge it from slot 14.

Variations in the embodiment disclosed could be made. The two legged, clothespin style spring locking lever 20 could theoretically be replaced with a elongated coil spring that would reside in an arcuate shape within the slots 30 and 24. Some other means would then have to be provided to give the locking lever 20 its axial downward bias, to keep it in the locked position. However, its own inherent resilience could be sufficient for that. It would be possible to make the locking lever 20 totally integral to the hook 18, although it would likely be beneficial to make the locking lever 20 separate, from thinner material than the hook 18, in order to save weight and in order to give it its useful inherent resiliency. The embodiment of locking lever 20 shown can be pried up and re opened, but the locking tab 22, or some additional member, could be arranged to effectively permanently lock into a slot when the hook 18 moved to its closed position, if there was no perceived need to be able to open the hook 18 later. Some raised surface other than the edge 16 could be used to frictionally engage the locking tab 22. However, the raised edge 16 is very convenient, since it is present anyway, and provides a long inside surface to block the locking lever's flange 26 and prevent it from rotating back when the locking tab 22 has popped off the edge 16. Therefore, it will be understood that it is not intended to limit the invention to just the embodiment disclosed.

We claim:

1. In a forkbolt of the type having a pin receiving slot with a closed end formed in a generally planar structural member and a hook that swings about a perpendicular axis from an open position clear of said slot to a closed position across said slot, so as to capture a pin within said slot, the improvement comprising a means associated with said hook which maintains the hook temporarily in its open position, which automatically shifts said hook from the open to the closed position as said pin enters the slot, which locks the hook in its closed position, and which also, in the hook closed position, resiliently captures the pin against the hook so as to dampen rattling of the pin within the slot, said means comprising in combination, a pivot shaft fixed through said structural member and hook to provide said axis, a locking lever fixed to said hook having an arcuate slot therein defined about said axis and a locking tab that overlies a raised surface on said structural member when said hook is in its open position and moves inboard of said raised surface in the closed position, a cam lever overlaying said locking lever and swinging about the same pivot shaft, said cam lever having an arcuate slot substantially equal in size to the locking lever's arcuate slot and alignable therewith, said cam lever also having a striker edge which, when said hook is in its open position with the two arcuate slots aligned, extends across said slot in a ready position that crosses the path of the pin into the pin slot, a circumferentially acting compression spring engaged under compression between the ends of both arcuate slots so as to resiliently maintain said slots aligned and thereby maintain said cam lever in its ready position when said hook is in its open position, said spring producing a return force that tends to realign said slots when said slots are moved out of alignment to further compress said spring, and, axially acting compression means actuated when said hook is in its open position to press said locking tab down and against said raised surface to frictionally hold said hook in its open position with less force than said return force, whereby, as said pin is pressed forcibly into said slot and against said cam lever striker edge, said cam lever is shifted back to misalign said arcuate slots and further compress said circumferentially acting spring, thereby shifting said locking lever tab off of said raised surface and swinging said hook to its closed position to capture said pin in said slot between said hook and cam lever, whereupon said axially acting compression means presses said locking lever down to lock said hook in its closed position and said circumferentially acting spring expands to substantially realign said arcuate slots and press said cam lever striker edge continually and resiliently against said pin to dampen rattling of said pin within said slot.

2. In a forkbolt of the type having a pin receiving slot with a closed end formed in a generally planar structural member and a hook that swings about a perpendicular axis from an open position clear of said slot to a closed position across said slot, so as to capture a pin within said slot, the improvement comprising a means associated with said hook which maintains the hook temporarily in its open position, which automatically shifts said hook from the open to the closed position as said pin enters the slot, which locks the hook in its closed position, and which also, in the hook closed position, resiliently captures the pin against the hook so as to dampen rattling of the pin within the slot, said means comprising in combination, a pivot shaft fixed through said structural member and hook to provide said axis, a locking lever fixed to said hook having an arcuate slot therein defined about said axis and a locking tab that overlies a raised surface on said structural member when said hook is in its open position and moves inboard of said raised surface in the closed position, a cam lever overlaying said locking lever and swinging about the same pivot shaft, said cam lever having an arcuate slot substantially equal in size to the locking lever's arcuate slot and alignable therewith, said cam lever also having a striker edge which, when said hook is in its open position with the two arcuate slots aligned, extends across said slot in a ready position that crosses the path of the pin into the pin slot, a spring having a pair of legs engaged under circumferential compression between the ends of both arcuate slots so as to resiliently maintain said slots aligned and thereby maintain said cam lever in its ready position when said hook is in its open position, said spring producing a return force that tends to realign said slots when said slots are moved out of alignment and further compress said spring, said spring further having a central coil that is axially compressed when said hook is in its open position to press said locking tab down and against said raised surface to frictionally hold said hook in its open position with less force than said return force, whereby, as said pin is pressed forcibly into said slot and against said cam lever striker edge, said cam lever is shifted back to misalign said arcuate slots and further compress said spring legs, thereby shifting said locking lever tab off of said raised surface and swinging said hook to its closed position to capture said pin in said slot between said hook and cam lever, whereupon said spring central coil presses said locking lever down to lock said hook in its closed position and said circumferentially acting spring expands to substantially realign said arcuate slots and press said cam lever striker edge continually and resiliently against said pin to dampen rattling of said pin within said slot.

3. In a forkbolt of the type having a pin receiving slot with a closed end formed in a generally planar structural member and a hook that swings about a perpendicular axis from an open position clear of said slot to a closed position across said slot, so as to capture a pin within said slot, the improvement comprising a means associated with said hook which maintains the hook temporarily in its open position, which automatically shifts said hook from the open to the closed position as said pin enters the slot, which locks the hook in its closed position, and which also, in the hook closed position, resiliently captures the pin against the hook so as to dampen rattling of the pin within the slot, said means comprising in combination, a pivot shaft fixed through said structural member and hook to provide said axis, a locking lever fixed to said hook having an arcuate slot therein defined about said axis having a locking tab a raised, elongated edge on said structural member that underlies said locking lever tab when said hook is in its open position and moves outboard of said locking lever tab when said hook is in the closed position, a cam lever overlaying said locking lever and swinging about the same pivot shaft, said cam lever having an arcuate slot substantially equal in size to the locking lever's arcuate slot and alignable therewith, said cam lever also having a striker edge which, when said hook is in its open position with the two arcuate slots aligned, extends across said slot in a ready position that crosses the path of the pin into the pin slot, a spring having a pair of legs engaged under circumferential compression within the ends of both arcuate slots so as to resiliently maintain said slots aligned and thereby maintain said cam lever in its ready position when said hook is in its open position, said spring producing a return force that tends to realign said slots when said slots are moved out of alignment and further compress said spring, said spring further having a central coil that is axially compressed when said hook is in its open position to press said locking tab down and against said raised surface to frictionally hold said hook in its open position with less force than said return force, whereby, as said pin is pressed forcibly into said slot and against said cam lever striker edge, said cam lever is shifted back to misalign said arcuate slots and further compress said spring legs, thereby shifting said locking lever tab off of said raised edge and swinging said hook to its closed position to capture said pin in said slot between said hook and cam lever, whereupon said spring central coil presses said locking lever down to lock said hook in its closed position and said circumferentially acting spring expands to substantially realign said arcuate slots and press said cam lever striker edge continually and resiliently against said pin to dampen rattling of said pin within said slot.

* * * * *